US009482562B2

(12) United States Patent
Hefetz et al.

(10) Patent No.: US 9,482,562 B2
(45) Date of Patent: Nov. 1, 2016

(54) SHIELDED RADIATION DETECTOR HEADS

(71) Applicant: General Electric Company, Schenectady, NY (US)

(72) Inventors: Yaron Hefetz, Tirat Carmel (IL); Jean-Paul Bouhnik, Tirat Carmel (IL); Nati Herman, Tirat Carmel (IL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/828,910

(22) Filed: Aug. 18, 2015

(65) Prior Publication Data

US 2016/0282153 A1    Sep. 29, 2016

Related U.S. Application Data

(63) Continuation-in-part of application No. 14/671,039, filed on Mar. 27, 2015.

(51) Int. Cl.
| | |
|---|---|
| *G01J 1/00* | (2006.01) |
| *G01D 11/24* | (2006.01) |
| *G21K 1/02* | (2006.01) |
| *G01T 1/20* | (2006.01) |

(52) U.S. Cl.
CPC .............. *G01D 11/245* (2013.01); *G01T 1/20* (2013.01); *G21K 1/02* (2013.01)

(58) Field of Classification Search
CPC .......... G01T 1/20; G01T 1/292; G01T 1/166
USPC ............ 250/336.1, 383.02, 336.03, 366, 368
See application file for complete search history.

(56) References Cited

U.S. PATENT DOCUMENTS

| | | | | | |
|---|---|---|---|---|---|
| 5,442,179 | A | * | 8/1995 | Ohishi ................. | G01T 1/1642 250/363.02 |
| 5,466,943 | A | * | 11/1995 | Green ................... | H01L 31/024 250/252.1 |
| 6,830,387 | B2 | * | 12/2004 | Rife ................. | G08B 13/19619 250/363.02 |
| 6,982,839 | B2 | * | 1/2006 | Schuler ................... | G01V 8/20 250/216 |
| 2014/0187923 | A1 | | 7/2014 | Heukensfeldt Jansen et al. | |
| 2015/0065873 | A1 | | 3/2015 | Tsukerman et al. | |
| 2015/0309184 | A1 | * | 10/2015 | Viscovic ............. | A61N 5/1001 600/1 |

OTHER PUBLICATIONS

Siegfried L. Stockinger, P.E., Nuclear Power Plant Gaseous Waste Treatment System Design, Prepared for the American Society of Mechanical Engineers—Radioactive Waste Systems Committee—Copyright 2012 (55 pages).

(Continued)

*Primary Examiner* — David Porta
*Assistant Examiner* — Meenakshi Sahu
(74) *Attorney, Agent, or Firm* — Dean D. Small; The Small Patent Law Group, LLC

(57) ABSTRACT

A radiation detector head assembly is provided that includes a detector housing and a detector unit. The detector housing defines a cavity therein. The detector housing includes a shell and a shielding body. The shell defines at least a portion of a perimeter surrounding the shielding body, and includes an extrusion defining the at least a portion of a perimeter. The extrusion is formed from a first material that is configured for rigidity. The shielding body includes a second material configured to shield radiation. The detector unit is disposed within the cavity, and includes an absorption member and associated processing circuitry.

20 Claims, 12 Drawing Sheets

(56) References Cited

OTHER PUBLICATIONS

Bolmsjo MS, Persson BR., Factors affecting the trapping performance of xenon holdup—filters in nuclear medicine applications; http://www.ncbi.nlm.nih.gov/pubmed/7078534; Jan. 1982, (1 page).

Pulmonex II Xenon System; http://www.biodex.com/nuclear-medicine/products/lung-ventilation-systems/pulmonex-ii-xenon-system.

* cited by examiner

SHIELDED RADIATION DETECTOR HEADS

RELATED APPLICATIONS

The present application is a continuation in part of U.S. patent application Ser. No. 14/671,039 (the "039 application"), entitled "Reduced Airborne Contamination Detector Heads," filed 27 Mar. 2015, the entire subject matter of which is incorporated by reference herein.

BACKGROUND

The subject matter disclosed herein relates generally to medical imaging systems, and more particularly to shielded detector heads.

In nuclear medicine (NM) imaging, such as single photon emission computed tomography (SPECT) or positron emission tomography (PET) imaging, radiopharmaceuticals may be administered internally to a patient. Detectors (e.g., gamma cameras), typically installed on a gantry, capture the radiation emitted by the radiopharmaceuticals and this information is used, by a computer, to form images. The NM images primarily show physiological function of, for example, the patient or a portion of the patient being imaged. Detectors, however, may be subject to undesired exposure to non-collimated radiation which negatively affects image quality, and may require re-imaging of the patient. Accordingly, shielding may be provided to gamma cameras. Certain conventional shielding approaches utilize lead plates affixed to a camera; however, such use of separate lead plates may result in gaps between plates and/or mounting holes that are effectively transparent to radiation.

BRIEF DESCRIPTION

In accordance with an embodiment, a radiation detector head assembly is provided that includes a detector housing and a detector unit. The detector housing defines a cavity therein. The detector housing includes a shell and a shielding body. The shell defines at least a portion of a perimeter surrounding the shielding body, and includes an extrusion defining the at least a portion of a perimeter. The extrusion is formed from a first material that is configured for rigidity. The shielding body includes a second material configured to shield radiation. The detector unit is disposed within the cavity, and includes an absorption member and associated processing circuitry.

In accordance with another embodiment, a method of providing a radiation detector head assembly is provided. The method includes extruding a first material to provide a shell defining a perimeter of a detector housing. The detector housing includes a cavity. The method also includes filling the perimeter of the shell with a second material to form a shielding body disposed within the shell. The second material is configured to shield radiation. Further, the method includes disposing a detector unit within the cavity of the detector housing. The detector it includes an absorption member and associated processing circuitry.

DETAILED DESCRIPTION

Figure 1:
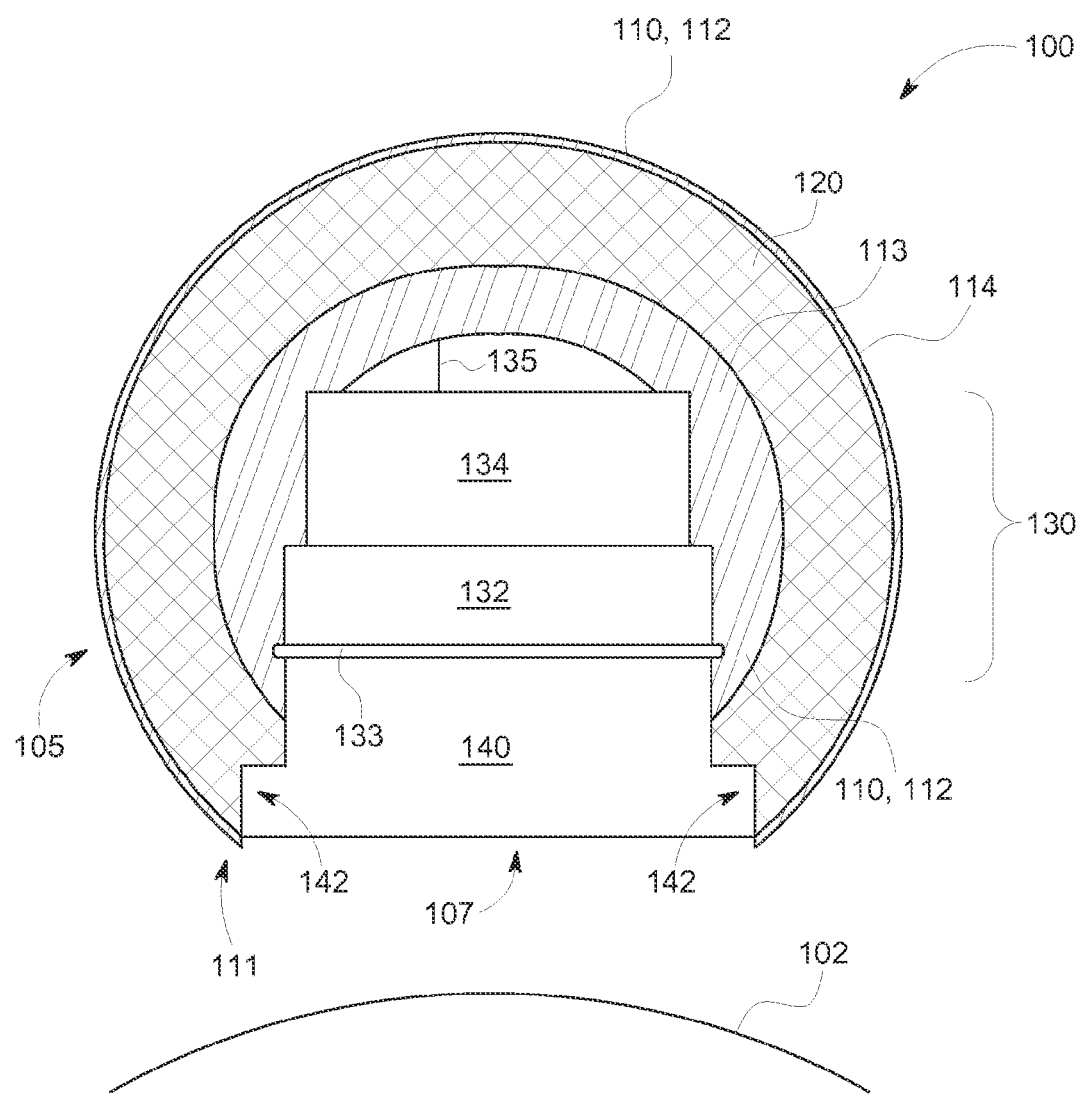
FIG. 1 provides a schematic sectional view of a radiation detector head assembly according to an embodiment.

The foregoing summary, as well as the following detailed description of certain embodiments and claims, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or an should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide shielded detector head assemblies, for use for example with an imaging system (e.g., detector head assemblies for a nuclear medicine gamma camera). In some embodiments a detector head assembly includes a shell made of a first material (e.g., aluminum) that is filled with a second material (e.g., lead), with the shell including a cavity into which a detector unit may be disposed. The shell may be extruded or otherwise formed as a unitary or integral unit, thereby eliminating the use of outer plates which may result in gaps that allow radiation passage and/or require use of fasteners that may allow radiation passage.

Various embodiments provide a reduced cost shielding structure for nuclear gamma cameras that provides high accuracy and effectiveness. Generally, an aluminum shell may be formed that defines a perimeter that may be filled with another material. An inner wall of the aluminum also defines a location where detector components may be positioned. Lead is then cast to fill the cavity, and the resulting aluminum-lead structure, after the lead has solidified, machined to create various features. For example, accurate positioning and/or support surfaces along with fiducial markers may be machined into the structure. As another example, tapped holes for mounting components may be machined into the structure (e.g., into the aluminum portion of the structure, as lead may be soft for tapping or threading). As one more example, a portion of the shell may be removed to expose a portion of the lead at a collimator interface. A detector head may then be assembled by disposing an electronics module interface printed circuit board and detector modules in the cavity, affixing end cap shields on either side of a detector housing formed by the shell, and mounting a collimator to the end caps.

It may be noted that while lead or tungsten may be used as radiation shields, use of either material alone may have various drawbacks. For example, lead is relatively soft and thus may not provide sufficient strength or rigidity when used as a structural material. Various conventional approaches may use lead parts secured to a scaffold of structural members; however, attaching lead to such a scaffold may utilize steel screws that are transparent to radiation. Additionally, space may be scarce in detector heads, and it may be advantageous to closely pack the detector heads, thus providing more detectors near the patient and allowing the detectors to closely approach the patient. Using scaffolds, however, requires a relatively large amount of space. Further, gaps may not be tolerable, for example at an interface between a collimator and a shield (light metals and/or plastics may be regarded as gaps as they do not block sufficient amounts of radiation). Tungsten, on the other hand, is a very hard metal, and is expensive to machine into complex structures.

In various embodiments, by casting molten lead into an aluminum frame, the lead may take the precise shape of the aluminum, with the aluminum providing structural strength to the shield. Structural, shielding, and other components (e.g., detector electronics) may be attached to the aluminum frame. It may be noted that aluminum further provides advantageous heat sink capability. It may further be noted that air bubble formation in casted lead may be eliminated or reduced by flowing molten lead from the bottom up during a casting process.

Where radiation gaps (e.g., gaps that may have a physical structure present but are effectively transparent to radiation) are present, sections of the aluminum frame may be machined off, exposing the lead and providing for direct contact with the lead. Where any gaps are to be filled, epoxy resin with tungsten powder may be employed to fill a gap (e.g., at an interface between a collimator and a shield). Additionally, the interior of the aluminum frame may have striations to help keep the lead attached to the frame during and after machining parts of the frame. Additionally, heat sink fins may be extruded as part of the frame.

A technical effect of at least one embodiment includes lowered cost of materials for radiation detector heads. A technical effect of at least one embodiment includes lowered cost of manufacturing of components for radiation detector head components and/or assembly of radiation detector heads. A technical effect of at least one embodiment includes improved detector performance (e.g., accuracy due to reduction of unwanted entry of radiation into detector components). A technical effect of at least one embodiment includes improved structural rigidity of radiation detector heads. A technical effect of at least one embodiment includes improved heat removal capability, for example, due to the direct contact of the lead to the aluminum. A technical effect of at least one embodiment includes improved heat removal capability, for example, due to the heat transfer properties of the aluminum.

Figure 2:
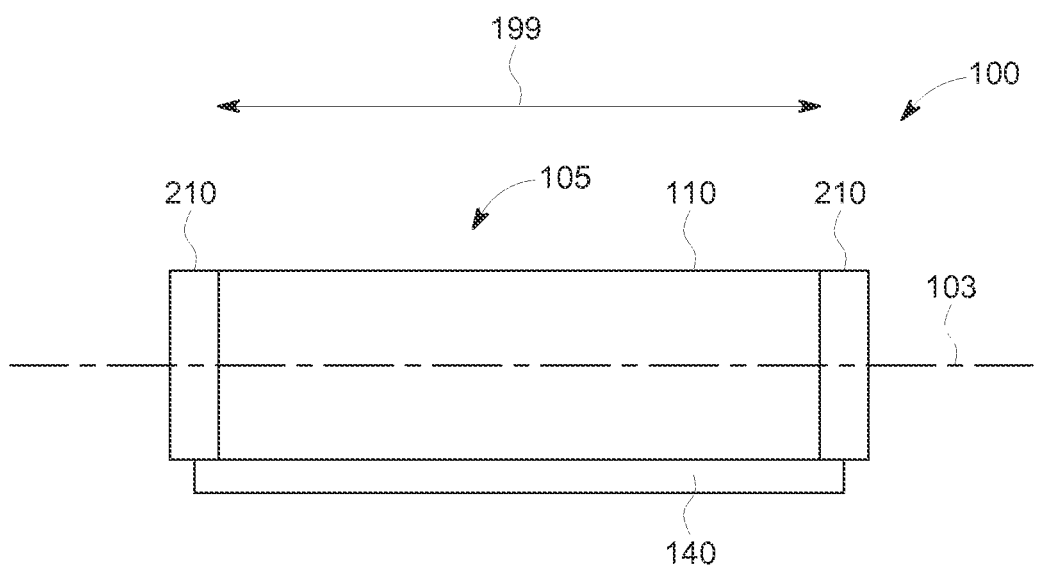
FIG. 2 provides a lengthwise side view of the radiation detector head assembly of FIG. 1.

FIG. 1 provides a sectional schematic view of a radiation detector head assembly 100 in accordance with various embodiments, and FIG. 2 provides a lengthwise side view of the radiation detector head assembly 100. It may be noted that the radiation detector head assembly 100 may be utilized in connection with medical imaging (e.g., nuclear medicine (NM) imaging, positron emission tomography (PET), single photon emission computed tomography (SPECT), or the like). For example, the radiation detector head assembly 100 may be a portion of an imaging system configured to image an object 102 (or a portion thereof). In some embodiments, the radiation detector head assembly 100 includes an arm (not shown in FIG. 1) that may adjustably couple the radiation detector head assembly 100 to a gantry (not shown in FIG. 1) of an imaging system. It may be noted that, while only one radiation detector head assembly 100 is shown in FIG. 1 for ease and clarity of illustration, multiple independently adjustable or positionable radiation detector head assemblies 100 may be employed in various embodiments. The radiation detector head assemblies may each define smaller individual fields of view that may be combined to provide a larger, combined field of view of an object being imaged. For example, the detector head assembly may be generally cylindrically shaped with a diameter of about 2.5 inches and a length of about 14 inches.

In the illustrated embodiment, the depicted radiation detector head assembly 100 includes a detector housing 105 and a detector unit 130. The detector housing 105 includes a cavity 107, and the detector unit 130 is disposed within the cavity. The detector housing 105 and detector unit 130 may be disposed within an outer detector housing 105 (not shown in FIG. 1 for ease and clarity of illustration) and configured to be rotated in a rotational direction 105 about an axis 103 (see FIG. 2). The rotation may be performed to orient the detector unit 130 in a desired orientation with respect to the object 102 being imaged.

The detector housing 105 includes a shell 110 and a shielding body 120. The shell includes an inner portion 113 and an outer portion 114. Generally, the shell 110 defines at least a portion of a perimeter 111 that surrounds the shielding body 120. For example, in the illustrated embodiment, the shell 110 comprises an extrusion 112 that defines the at least a portion of the perimeter 111 surrounding the shielding body 120. The extrusion 112, for example, may be a hollow "C" or "U" shape with a lumen into which lead or other shielding material may be cast. In some embodiments, the extrusion may be first formed and the shielding body 120 subsequently formed within an interior cavity defined by the extrusion, with the extrusion defining a perimeter surrounding the shielding body 120 in at least two dimensions. Then, as discussed in more detail elsewhere herein, a portion of an external part of the extrusion may be removed to expose a portion of the shielding body 120, so that the extrusion defines a part of the perimeter surrounding the shielding body 120, but not the entire perimeter. In FIG. 1, the radiation detector head assembly includes exposed portions 142 of the shielding body 120 that are not directly surrounded by the shell 110.

The shell 110 is sized and configured to provide sufficient rigidity to the detector housing 105. For example, relatively soft or non-rigid materials may not provide sufficient accuracy or consistency in the placement or orientation of detectors during use, and/or may not provide sufficient rigidity during rotation or pivoting of the detector housing 105. The shell 110 may be made of a first material configured or selected to provide sufficient rigidity to the detector housing 105. In addition to providing sufficient rigidity, the first material may also be configured or selected to be as light weight and/or low cost as feasible, within the constraint of providing the desired rigidity. Further, the first material used for the shell 110 may be selected or configured to be formable, for example by extrusion, or as another example, by casting. In the illustrated embodiment, the shell 110 is made of Aluminum that is extruded to provide a desired cross section extending along an axial or longitudinal dimension 199 (see also FIG. 2). Aluminum, for example, may be generally transparent to radiation. Accordingly, to protect electronics and/or other aspects of the detector from radiation that may confound results of imaging scans, a second material may be added to shield the cavity 107 (or portions thereof) from radiation. The cross section of the shell 110 defines a perimeter into which a second material used to form the shielding body 120 may be added (e.g., poured or otherwise filled).

The second material used to form the shielding body 120 is configured to shield radiation, or protect components within the cavity 107 from undesired radiation. In the illustrated embodiment, the second material used to from the shielding body 120 is lead, which may be poured or otherwise added in a molten form to the shell 110 and allowed to solidify. The shell 110 may include striations or other features formed on an interior of the perimeter to improve the adherence or structural joining of the shielding body 120 to the shell 110.

Figure 3:
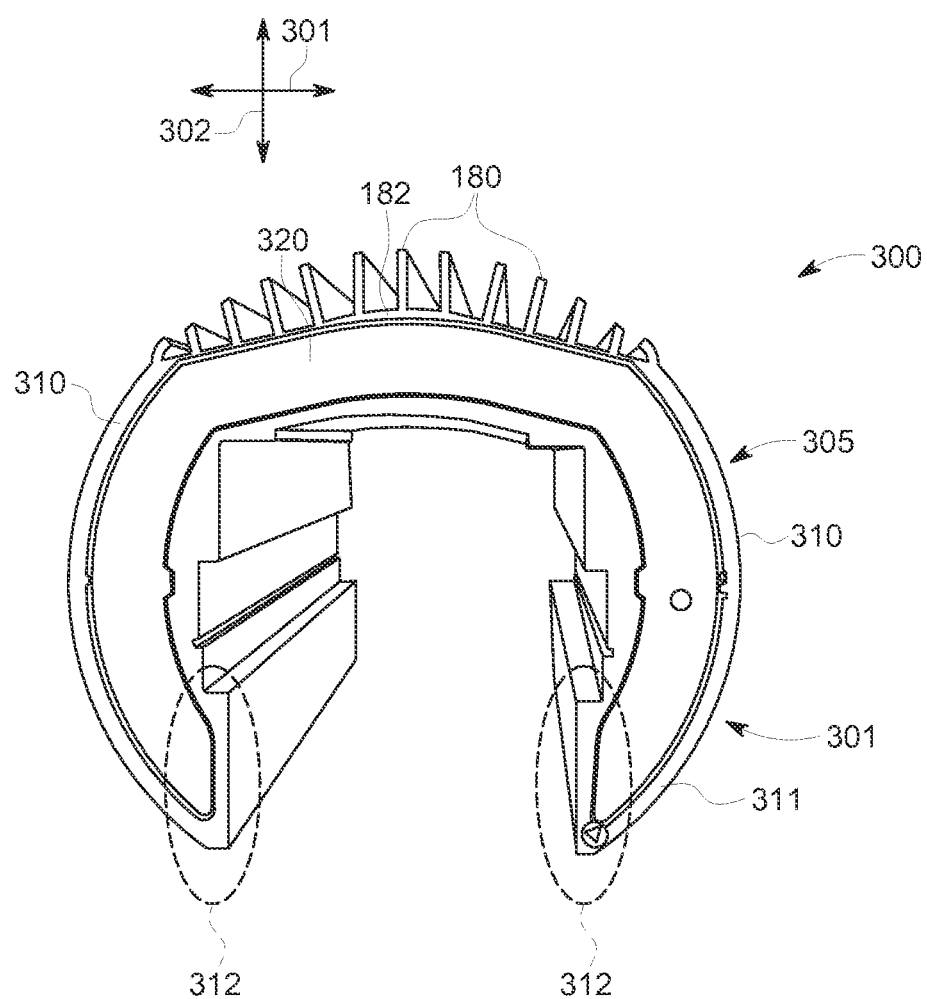
FIG. 3 provides a schematic sectional view of a radiation detector head assembly before machining according to an embodiment.
Figure 4:
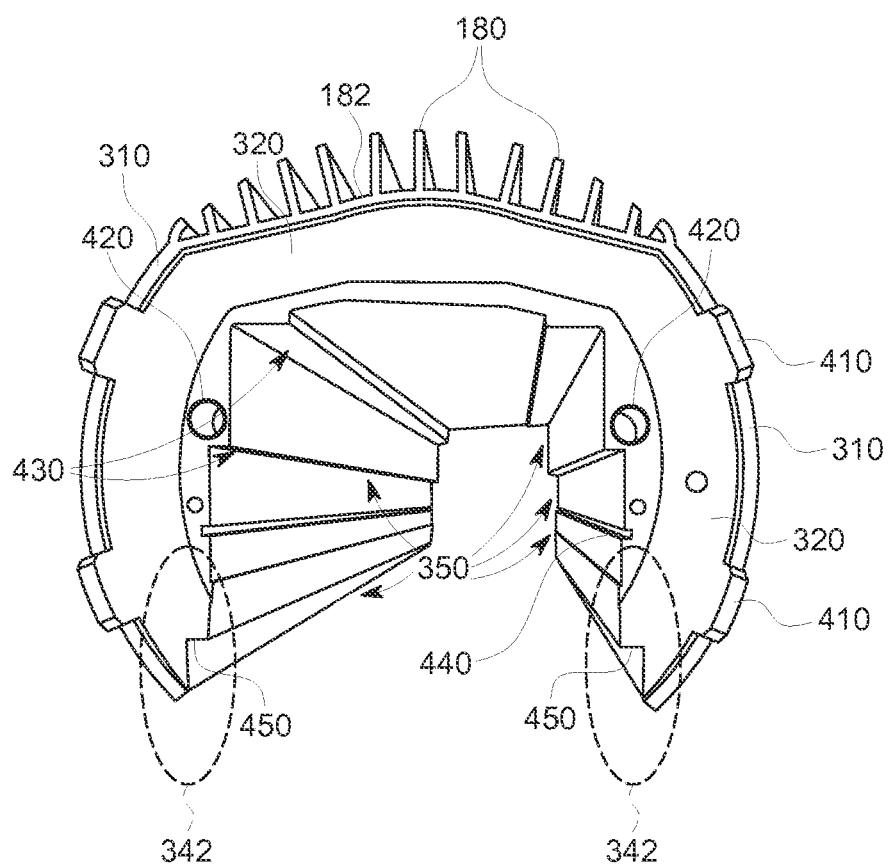
FIG. 4 provides a schematic sectional view of the radiation detector head assembly of FIG. 3 after machining.

It may be noted that, in various embodiments, one or more portions of the shell 110 may be removed to provide an exposed surface of the shielding body 120. Put another way, a shell 110 may be initially formed that provides a perimeter that completely surrounds the shielding body 120 in at least two dimensions. Then, at least a portion of the shell 110 may be removed so that the Shell no longer completely surrounds the shielding body. FIG. 3 illustrates an example of a detector head assembly 300 that includes an initially formed shell that completely surrounds a shielding body in at least two dimensions, and FIG. 4 illustrates the detector head assembly 300 of FIG. 3 with a portion of the shell removed to provide an exposed surface of the shielding body. It may be noted that, in some embodiments, the shell 110 may include various landmarks for mounting the detector unit 130, end caps 210 (see FIG. 2) and/or collimator 140.

As seen in FIG. 3, the detector head assembly 300 includes a detector housing 305 that in turn includes shell 310 and a shielding body 320. The shell 310 and shielding body 320 may be generally similar in various respects to the shell 110 and shielding body 120 discussed herein. As seen in FIG. 3, the shell 310 defines a cross-sectional shape 301 that has an initial perimeter 311 that completely surrounds the shielding body 320 in both a first transverse dimension 302 and a second transverse dimension 303. The transverse dimensions 302 and 303 are perpendicular to each other, as well as perpendicular to an axial direction (e.g., direction 199) along which the cross-sectional shape 301 extends. The initial perimeter 311 includes portions 312 that are to be removed. For example, the portions 312 may be located in a position at which a collimator (e.g., collimator 140) is to be mounted to the detector housing 305. Because the material used for the shell 310 (e.g., Aluminum) may be substantially transparent to radiation, having a portion of the shell 310 between the shielding body 320 and a corresponding collimator may result in a gap through which undesired radiation may access detector components, adversely affecting detector performance. Accordingly, material located at the portions 312 may be removed to provide one or more exposed surfaces of the shielding body 320, with the collimator in direct contact with the allow for the collimator to be mounted in direct contact with the exposed surface of the Shielding body 330, reducing or eliminating the entry of undesired radiation into the cavity of the detector head assembly 300.

FIG. 4 illustrates the detector head assembly 300 after various machining process. For convenience, accuracy, and/or cost effectiveness, in various embodiments all of the machining processes (or at least several) may be performed with the detector head assembly secured in a single position (e.g., in a fixture). Generally, machining or other processing may be performed on the detector head assembly 300 to remove portions of Aluminum (or other material) for collimator mounting, for positioning and/or locating detector components in a cavity (e.g., cavity 107), for positioning and mounting end caps, for example.

For example, as seen in FIG. 4, portions of the shell 310 have been removed to provide exposed surfaces 342 of the shielding body 320. A collimator may be mounted to the exposed surfaces 342 to help provide a gap-free collimator mounting (e.g., elimination of a gap between a collimator and a shielding material). As another example, various location features 350 (e.g., tabs 410, end plug holes 420, ledges 430, notches 440, collimator ledges 450) may be machined (or otherwise formed) into opposed ends of the detector housing 300. The location features 350 may provide various landmarks for mounting detector components, end caps 210, and/or collimator 140. For example, tabs 410 may be formed to cooperate with corresponding features of end caps to provide a desired rotational orientation of the end caps with respect to the shell 310 and cavity 307. As another example, end plug holes 420 may be formed to cooperate with end plugs of the end caps to help properly position the end caps. Additionally, ledges 430 and/or notches 440 may be formed to provide for positioning, mounting, and/or support for components of a detector unit or module, including electronics boards or other electrical components. For example, in some embodiments, notches 440 may accept wings or other extensions of a detector unit or module. As another example, notches 440 may accept a foam member (e.g., compressible body 133). Collimator ledges 450 may also be formed (e.g., at least partially in the shielding body 320) for positioning and/or support of a collimator.

As noted herein, end caps may be used to mount a collimator (e.g., collimator 140). For example, the end caps may be mounted to opposite ends of the detector housing (e.g., detector housing 105), with the collimator mounted to the end caps. The collimator unit may be registered to the absorption member 132 of the detector unit 130 (e.g., each opening of the collimator may be aligned with a corresponding pixel or pixels of the detector unit 130), with the end caps precisely mounted to the detector housing as discussed herein to provide for accurate positioning of the collimator. FIG. 2 provides a side view of the radiation detector head assembly 100. As shown in FIG. 2, the radiation detector head assembly 100 has end caps 210 mounted to the ends of the detector housing 105. The end caps 210, for example, may be positioned outside of a field of view of the detector, and configured to accept collimator mounting screws, thereby eliminating or reducing any mounting holes in the shell 110 and/or shielding body 120 that may be in the pathway of radiation that may adversely affect detector performance.

With continued reference to FIG. 1, the depicted radiation detector head assembly 100 includes a detector unit 130, a collimator 140, and a compressible body 133. Generally, the detector unit 130 is configured to detect radiation emitted from the object 102 (e.g., a human patient). The collimator 140 is interposed between the detector unit 130 and the object 102, and is configured to control angles at which radiation is allowed to pass to the detector unit 130 from the object 102 in an imaging direction 104. For example, the collimator 140 in some embodiments includes an array of tubes having small diameter holes configured to allow passage of photons only in a generally normal direction to a detector surface of the detector unit 130. The detector unit 130 includes an absorption member 132 and associated processing circuitry 134. Generally, the absorption member 132 is configured to receive radiation passing through the collimator 140 and to generate electronic signals, in conjunction with the processing circuitry 134, in response to radiation received and/or absorbed by the absorption member 132. The absorption member 132 may be a pixelated detector having pixels that are registered to corresponding openings of the collimator 140. Accordingly the detector unit 130 and the collimator 140 may be appropriately aligned with each other within the cavity 107. The absorption member 132 may be formed of a semiconductor material, such as Cadmium Zinc Telluride (CdZnTe), often referred to as CZT, Cadmium Telluride (CdTe), or Silicon (Si), among others.

It may be noted that, in use, the processing circuitry 134 may generate an amount of heat that can potentially affect performance of the detector unit 130. Accordingly, air may be directed over the detector housing 105 including the detector unit 130 to cool the detector unit 130 and prevent or inhibit loss of performance due to heating of the detector unit 130. Further, as best seen in FIGS. 3 and 4, the radiation detector head assembly 100 may include heat transfer fins 180 that extend from an exterior edge 182 of the shell 110. As schematically depicted in FIG. 1, the radiation detector head assembly 100 also includes a heat transfer link 135. The heat transfer link 135 is operably coupled to the shell 110 and the processing circuitry 134 of the detector unit 130. The depicted heat transfer link 135 is formed of a thermally conductive material and is physically connected (e.g., in contact with) both the processing circuitry 134 and the shell 110. Accordingly, heat generated by the processing circuitry 134 may be transferred from the processing circuitry 134 to the shell 110 via the heat transfer link 135 (and subsequently from the shell 110 to a surrounding environment and/or associated cooling system via the heat transfer fins 180). For additional details regarding an example of a heat transfer link and related components, see FIGS. 8 and 9 and related discussion.

It may be noted, as discussed in more detail in the '039 application, the detector housing 105 (or body within which the collimator 140 and detector unit 130 are disposed) may be spaced at a distance from an interior surface of an external housing, thereby defining a passageway between the detector housing and the external housing. The passageway allows for the passage of air (e.g., axially) over the detector housing as well as providing a clearance for rotational movement of the detector housing with respect to the external housing. For example, air may be passed over the detector housing axially (e.g., in a direction parallel to or along the direction 199 (or longitudinal dimension)). In various embodiments the air may also be circulated transversely (for example, the heat sink fins may extend circumferentially along the detector housing 105 instead of longitudinally as shown in FIGS. 3 and 4).

With continued reference to FIG. 1, the radiation detector head assembly 100 also includes a compressible body 133 interposed between the collimator 140 and the absorption member 132. The compressible body 133 may be made, for example, of a foam material that is generally transparent to radiation. The compressible body helps to maintain the detector unit 130 in a desired position, while only requiring mounting of the collimator 140 to the end caps outside the field of view, helping to eliminate or reduce mounting holes within the field of view or otherwise at an axial position occupied by the detector unit 130.

Figure 5:
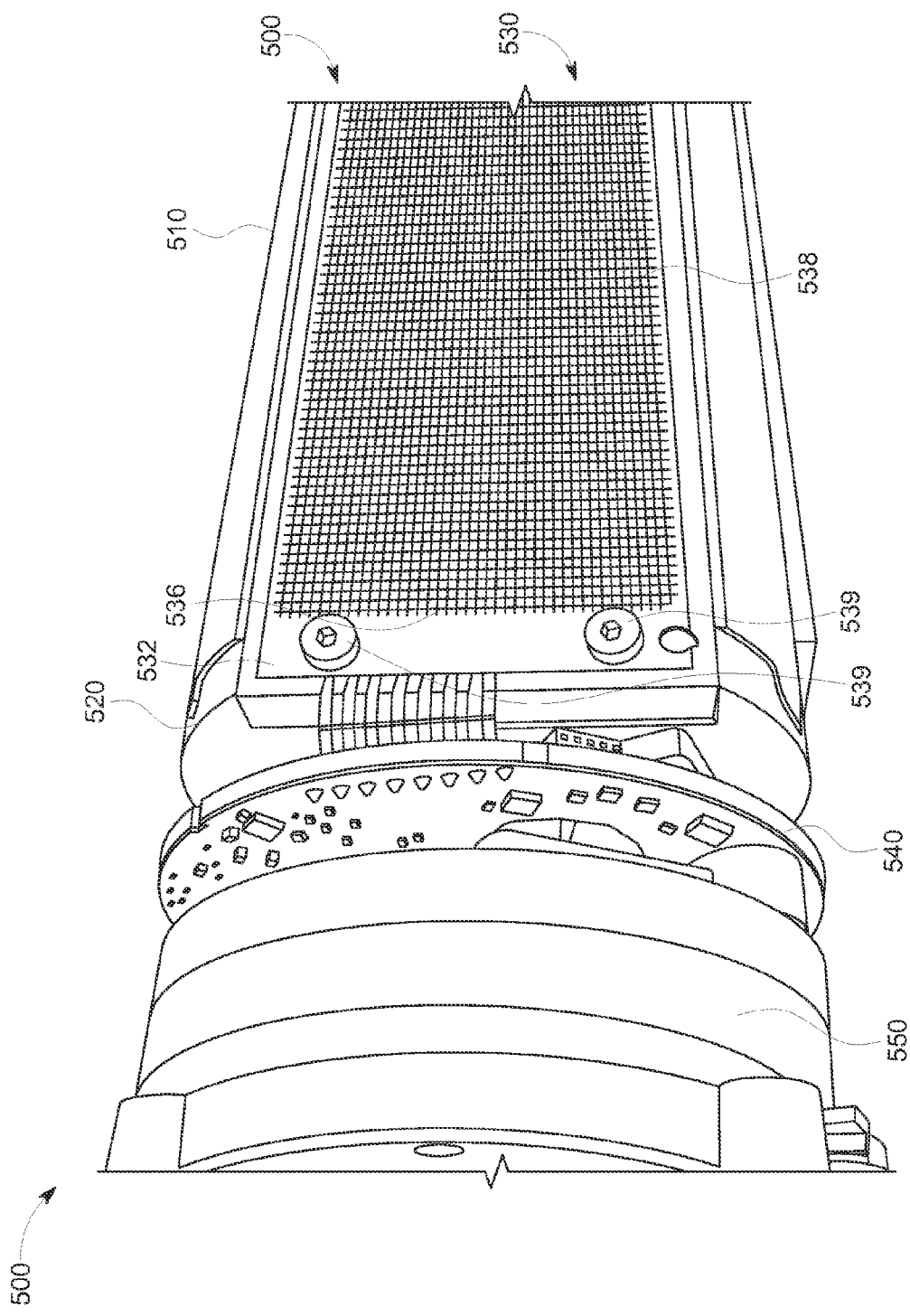
FIG. 5 provides a perspective view of a radiation detector assembly according to an embodiment.

It may be noted that radiation detector head assemblies as discussed herein (e.g., radiation detector head assembly 100) may be utilized as part of a radiation detector assembly configured to pivot, translate, or otherwise position detectors and/or detector head assemblies. FIG. 5 provides a perspective view of a radiation detector assembly 500 according to an embodiment. The radiation detector head assembly 500 includes a shell 510 and end caps 520. The shell 510 and end caps 520, for example, may be generally similar in various respects to shells and end caps discussed herein in connection with other figures. The radiation detector assembly 500 also includes a collimator unit 530 that in turns includes a collimator core 538 and a collimator frame 532. The collimator frame 532 may be made, for example, of stainless steel, or, as another example, tungsten, and include horizontal septa alignment and holding notches 536 and vertical septa alignment and holding notches 534. The notches 534, 536 are configured to secure, position, and hold corresponding septa or walls of the collimator core 538 within the collimator frame 532, thereby defining openings that may be registered to a detector unit disposed within the radiation detector head assembly 500. The collimator unit 530 of the illustrated embodiment is mounted to the end cap 520 with frame holding screws 539, which are positioned outside of the field of view of the collimator unit 530 in the depicted embodiment. The radiation detector assembly also includes a rotating printed circuit board 540 that may rotate with the shell 510 and end caps 520, and a slip ring 550 configured to provide electrical communication between rotation portions of the radiation detector assembly 500 and non-rotating portions of the radiation detector assembly 500.

Figure 6:
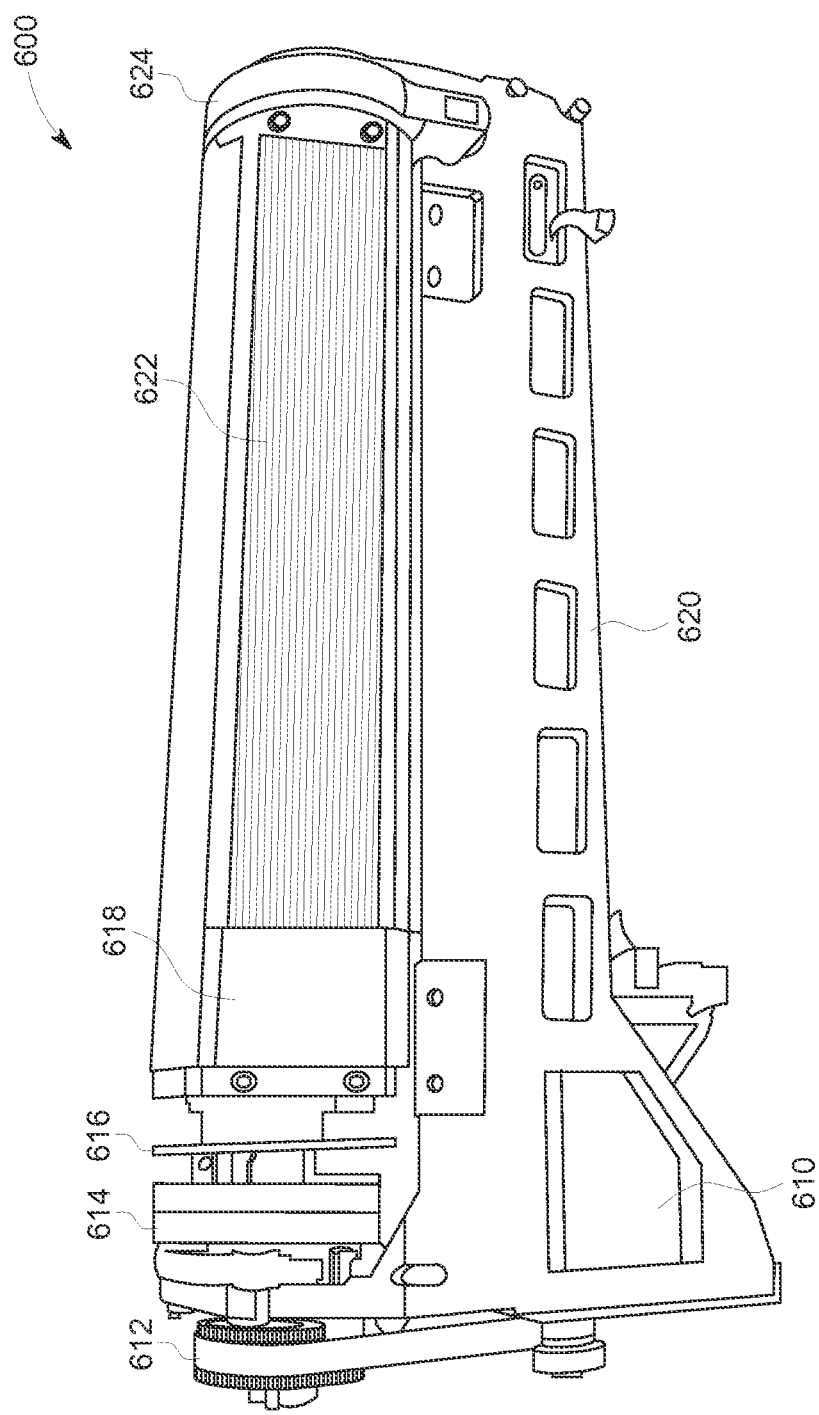
FIG. 6 provides a side view of a radiation detector head assembly according to an embodiment.

As discussed herein, a radiation detector head assembly may include a rotor assembly (e.g., a rotor assembly including a detector housing such as detector housing 105) configured to rotate relative to a housing in which the rotor assembly is disposed. FIG. 6 shows a side view of radiation detector head assembly 600, including a motor for rotating the rotor assembly within the housing, which may also be referred to as pivoting the radiation detector head assembly, formed in accordance with various embodiments. One or more aspects of the detector assembly 500 may be utilized in conjunction with the radiation detector head assembly 600. As seen in FIG. 6, the depicted radiation detector head assembly 600 includes a motor 610, a pivot belt 612, a slip-ring 614, electronics module 616, a rotor 618, a stator 620, a collimator 622, and an air duct 624. A cover or housing for the radiation detector head assembly 600 has been removed for improved clarity and ease of illustration.

The motor 610 (e.g., an electric motor) may be controlled by a processing unit of an imaging system to rotate the rotor 618 (which may include one or more aspects of rotor assemblies discussed herein). The motor 610 is mounted to the stator 620, and is coupled to the rotor 618 via the pivot belt 612. The slip-ring 614 allows for electrical communication between the electronics module 616 (which rotates with the rotor 618) and electronics mounted to the stator 620 or other structure that does not rotate with the rotor 618. In some embodiments, the rotor 618 may rotate over a range of, for example, about 210 degrees to provide flexibility in orienting a detector of the radiation detector head assembly 600. The air duct 624 is in fluid communication with a passageway surrounding at least a portion of the rotor 618 to provide for heat removal from the rotor 618 using air from an atmosphere surrounding an imaging system including the radiation detector head assembly 600 and object being imaged. Additional discussion regarding example systems including radiation detector head assemblies may be found in U.S. patent application Ser. No. 14/016,939, filed Sep. 3, 2013, entitled "Methods And Systems For Controlling Movement Of Detectors Having Multiple Detector Heads," which is hereby incorporated by reference in its entirety.

Figure 7:
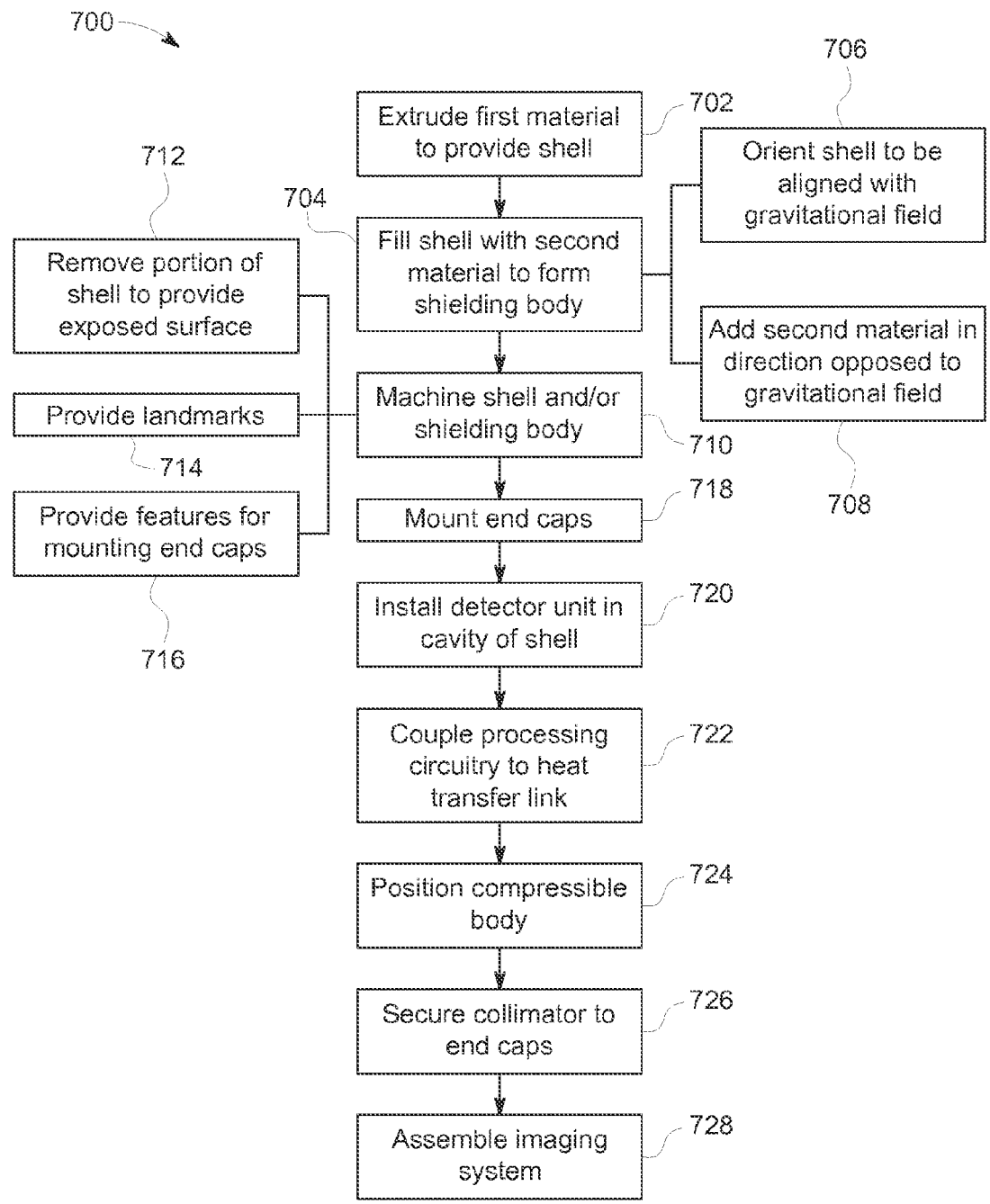
FIG. 7 provides a flowchart of a method according to an embodiment.

FIG. 7 provides a flowchart of a method 700 for forming, assembling, and/or otherwise providing a radiation detector head assembly, in accordance with various embodiments. The method 700, for example, may employ or be performed by structures or aspects of various embodiments (e.g., systems wad/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 702, a first material (e.g., aluminum) is extruded to provide a shell. The shell has a cross-sectional shape that defines a perimeter of a detector housing having a cavity. The shell may form an inner wall and an outer wall, with the cavity extending into the inner wall. Generally, the first material is selected to provide sufficient strength and rigidity to a detector housing for which the extrusion made from the first material may be used as a shell. The use of an extruded shell (or shell formed otherwise that provides a seamless perimeter) helps avoids the use of plates and/or fasteners for joining shielding plates that may provide gaps or holes through which unwanted radiation may enter. Instead, as discussed herein, a monolithic or integrally formed shielding body may be disposed within the shell providing seamless and continuous protection from unwanted radiation entering the cavity of the shell. It may be noted that forming or providing the shell may also include forming heat transfer fins in various embodiments. For example, heat transfer fins extending axially along the shell may be formed as part of an extrusion. Alternatively, fins may be added to the shell after the shell is extruded.

At 704, the perimeter of the shell is filled with a second material to form a shielding body disposed within the shell. The second material is configured to shield radiation. In various embodiments, the second material is Lead. In various embodiments, the Lead may be added to the perimeter of the shell in a particular orientation and/or direction, for example to help reduce the formation of air bubbles. For example, in the illustrated embodiment, at 706, the shell is oriented to be aligned longitudinally with a gravitational field (e.g., with direction 199 aligned with a gravitational field). At 708, the second material is added to the shell to fill the shell in a direction opposed to the gravitational field. For example, molten lead may be injected from the bottom of the shell toward the top. Accordingly, the formation of air bubbles caused by pouring a liquid may be eliminated or reduced. After the second material has been added to the shell in a liquid or molten form, the second material may be allowed to solidify.

At 710, with the second material solidified, the shell (first material) and shielding body (second material) are machined to provide precise location of various features used for mounting additional components to the shell and/or shielding body. In some embodiments, both the second material and first material may be machined or processed at or near the same time (e.g., with the same cutting tool). For example, portions of each may be removed to provide a flat exposed surface (or surfaces) of the shielding body for positioning of a collimator in direct contact with the flat exposed surface. In the illustrated embodiment, at 712, a portion of the shell is removed to provide an exposed surface of the shielding body for contact with a collimator unit. At 714, a detector housing formed by the shell and shielding material may be machined to provide landmarks for mounting, positioning, and/or supporting a detector unit. The landmarks may include ledges and/or notches. At 716, features (e.g., tabs, end plug holes, mounting holes) for mounting end caps to the detector housing are machined into end faces of the shell.

At 718, end caps may be mounted at each end of the detector housing formed by the shell and the shielding body. The end caps may be mounted, for example, using mounting features and/or alignment guides provided at 716. At 720, a detector unit is disposed or installed in the cavity of the shell. The detector unit (e.g., detector unit 130) may include an absorption member and associated processing circuitry. For example, the processing circuitry may include one or more printed circuit boards, which may be placed in electrical communication with one or more processors external to the cavity via the end caps. Features such as ledges and/or notches may be utilized to position and/or support the detector unit or components thereof in a desired position. At 722, the processing circuitry may be coupled to a heat transfer link thermally coupling the processing circuitry to the shell to help dissipate heat generated by the processing circuitry.

Then at 724, a compressible body is positioned adjacent to the detector unit at an immediately less deep position in the cavity. The compressible body may be made of foam, for example. Next, at 726 a collimator unit is secured to the end caps. The components within the cavity are sized as configured so that when the collimator unit is secured to the end caps, the foam is slightly compressed between the collimator unit and the detector unit to help secure the detector unit in a desired position with the collimator unit registered to the absorption unit of the detector unit. For example, as the collimator unit compresses the foam, the detector unit may be urged against one or more ledges and/or notches helping to align and secure the detector unit in a desired position. At 728, with the detector housing assembled and the detector unit disposed within the cavity, the radiation detector head assembly may be utilized in the assembly of an imaging system (see, e.g., FIGS. 5, 6, 8-11, and related discussion).

Figure 8:
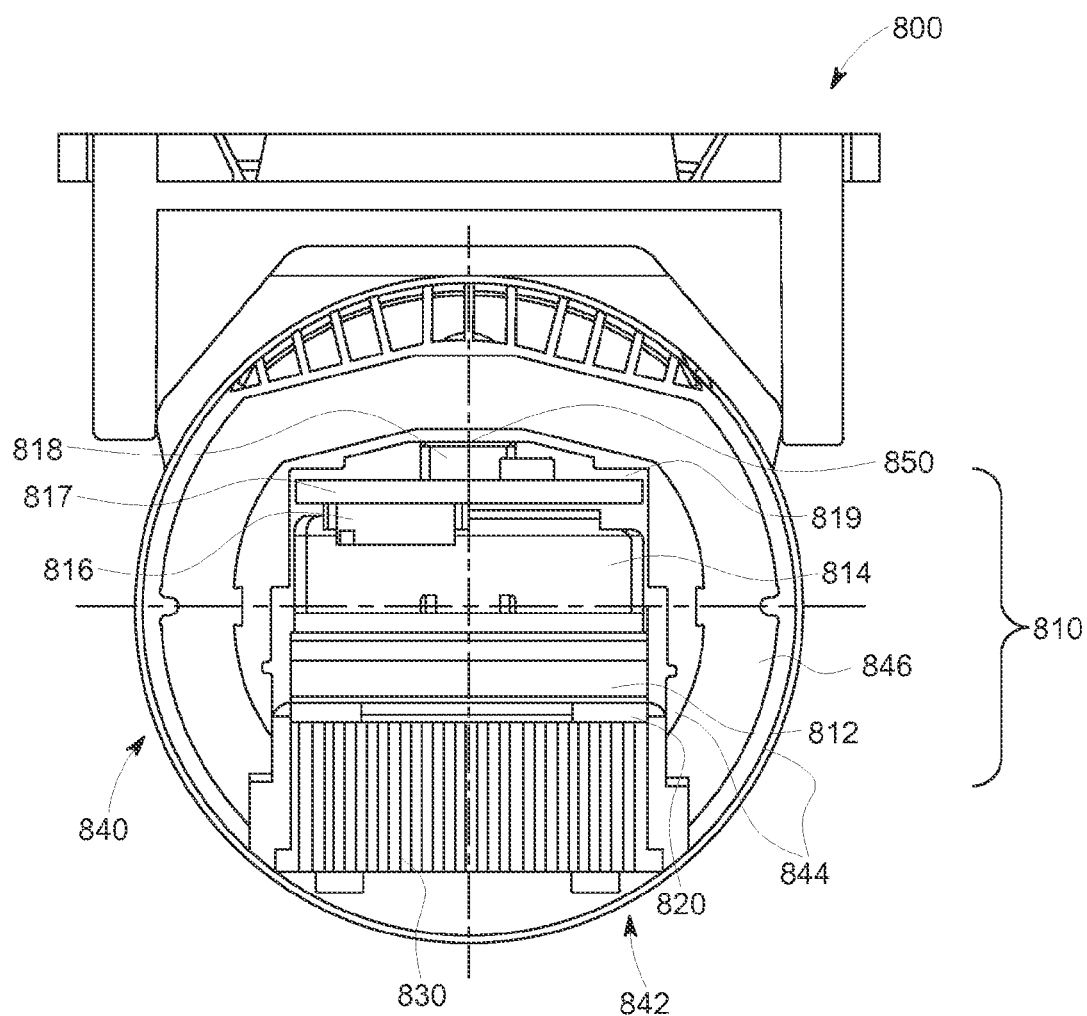
FIG. 8 provides a schematic sectional view of a radiation detector head assembly according to an embodiment.

FIG. 8 provides a schematic sectional view of a radiation detector head assembly 800 according to an embodiment. The radiation detector head assembly 800 may be generally similar in various respects to the radiation detector head assembly 100 discussed herein. As seen in FIG. 8, the radiation detector head assembly 800 includes a detector unit 810. The detector unit 810 includes a CZT detector 812, module electronics circuit 814, electronic connector 816, motherboard 817, heat transfer extension 818, and high voltage pin 819. The electronic connector 816 electrically couples the motherboard 817 and the module electronics circuit 814. The module electronics circuit 814 may include a number of circuits, for example, the module electronics circuit 814 may include one or more printed circuit boards, ASIC's, and/or FPGA's. The radiation detector head assembly 800 also includes a compressible member 820 interposed between a collimator 830 and the detector unit 810. The detector unit 810, compressible member 820, and collimator 830 are disposed within a cavity 842 of a housing 840 that includes a shell 844 (e.g., an aluminum shell as discussed herein) and a shielding body 846 (e.g., a lead shielding body as discussed herein).

The heat transfer extension 818 (which is an example of a heat transfer link 135) is configured to conduct heat from the detector unit 810 to the shell 844 to help dissipate heat generated by the detector unit 810, in the embodiment depicted in FIG. 8, the radiation detector head assembly 800 also includes a heat transfer plate 850 interposed between the shell 844 and the heat transfer extension 818. The heat transfer plate 850 is in contact with both the shell 844 and the heat transfer extension 818, and is configured to transfer heat from the heat transfer extension 818 to the shell 844. The depicted heat transfer member 850, while thermally conductive, is electrically insulating and insulates the shell 844 and heat transfer extension 818 (and accordingly also the detector unit 810) from electrical communication therebetween. Use of a thermally conductive but electrically insulating heat transfer plate 850 in various embodiments allows for the use of more readily available, less expensive, and/or more structurally suitable materials for the heat transfer extension 818 that may be both electrically and thermally conductive.

Figure 9A:
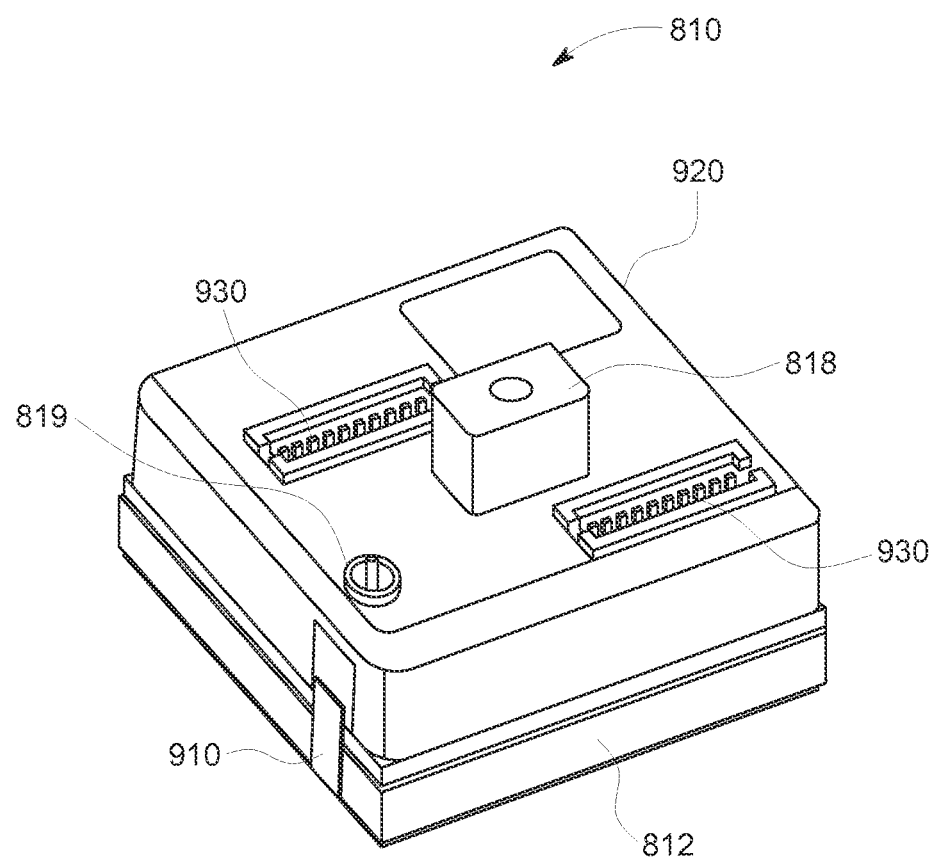
FIG. 9A provides a perspective view of the detector module of FIG. 8.
Figure 9B:
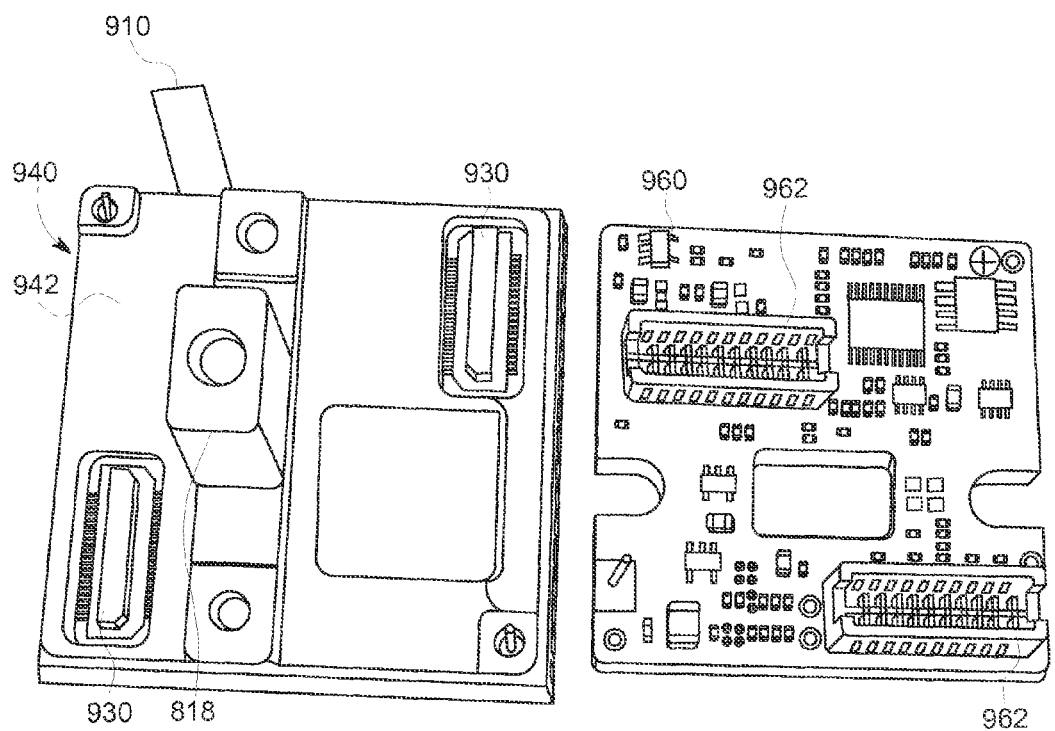
FIG. 9B provides an exploded view of components of the detector module of FIG. 8.

FIG. 9A provides a perspective view of the detector module 810, and FIG. 9B provides an exploded view of components of the detector module 810. As seen in FIGS. 9A and 9B, the detector module includes a high voltage conductor 910 that electrically couples the high voltage pin 819 to a cathode face of the CZT detector 812. The detector module 810 also includes a cover 920 (e.g., a plastic cover) that has openings for the heat transfer extension 818 as well as electrical connectors 930. The electrical connectors 930, which may be an example of electrical connector 816, may be used to electrically couple an analog circuit board to a digital circuit board (e.g., to electrically couple the module electronics circuit 814 and motherboard 817). As best seen in FIG. 9B, the heat transfer extension 818 may be a portion of a heat transfer member 940 that also includes a base 942 from which the heat transfer extension 818 extends. The base 942 may be disposed adjacent to and in contact with one or more printed circuit boards (e.g., printed circuit board 960 including ASICs 962) of the detector module 810, with heat from the detector module 810 transferred to the base 942, and from the base 942 to the shell 844 via the heat transfer extension 818.

Figure 10:
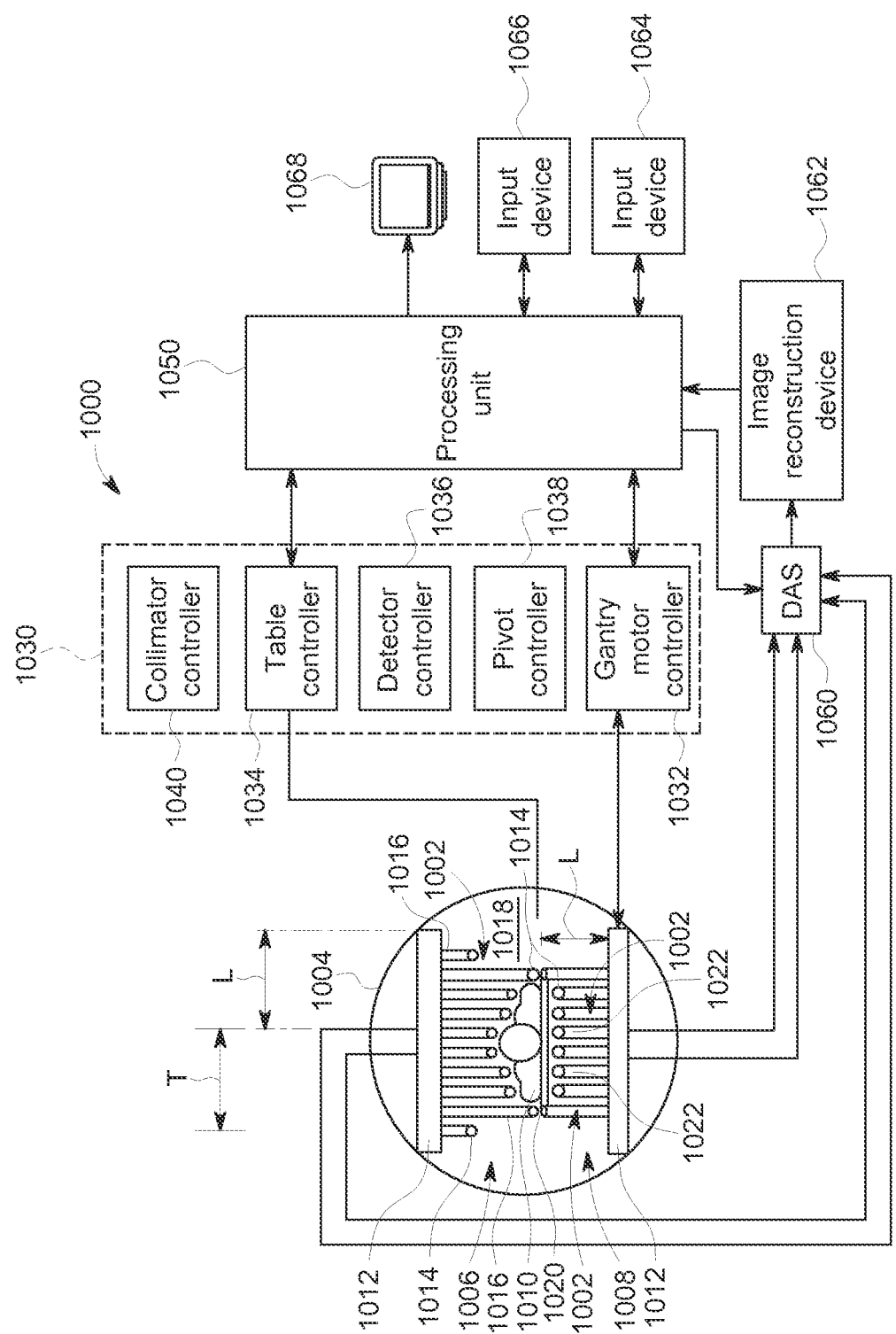
FIG. 10 shows a schematic view of an imaging system, according to an embodiment.
Figure 11:
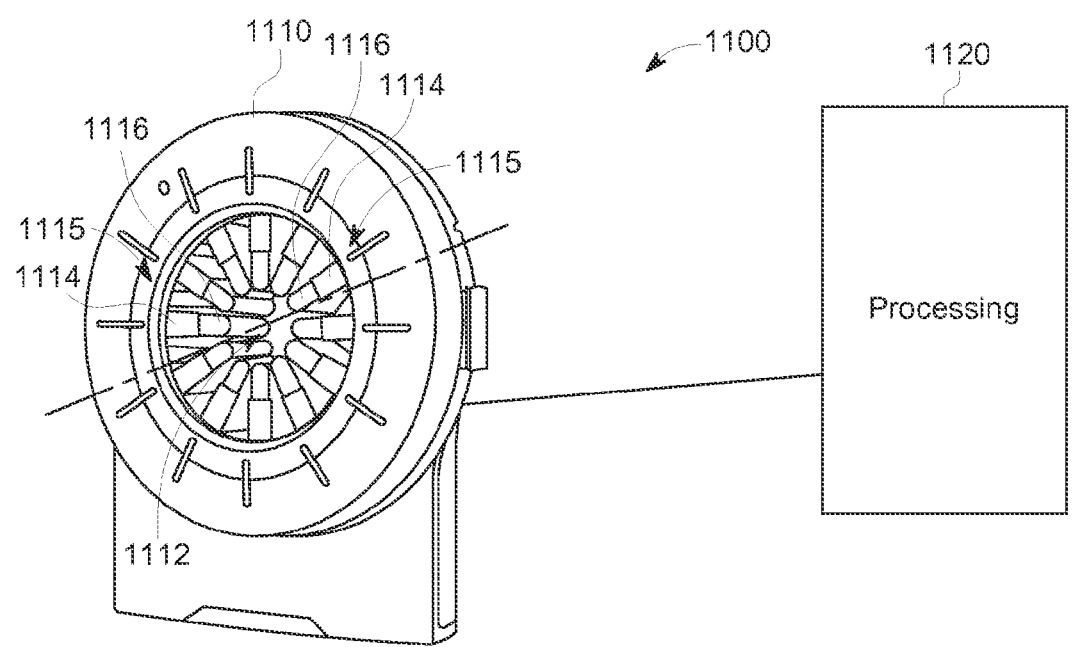
FIG. 11 shows a schematic view of an imaging system, according to an embodiment.

The embodiments described above and illustrated by FIGS. 1-9 may be implemented in medical imaging systems, such as, for example, SPECT, SPECT-CT, PET and PET-CT. Various methods and/or systems (and/or aspects thereof) described herein may be implemented using a medical imaging system. For example, FIG. 10 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). It should be noted that the arrangement of FIG. 10 is provided by way of example for illustrative purposes, and that other arrangements (e.g., detector arrangements) may be employed in various embodiments. For example, in various embodiments, a separate image reconstruction device 1062 may not be employed. As another example, a separate collimator controller 1040 may not be employed in various embodiments. As additional examples, DAS 1060 may be part of the detector controller 1036, and controller unit 1030 and/or image reconstruction device 1062 may be implemented on a main computer (e.g., processing unit 1050). In the illustrated example, a plurality of imaging detectors 1002 are mounted to a gantry 1004. In the illustrated embodiment, the imaging detectors 1002 are configured as two separate detector arrays 1006 and 1008 coupled to the gantry 1004 above and below a subject 1010 (e.g., a patient), as viewed in FIG. 10. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 10). It may be noted that, while the embodiment depicted in FIG. 10 shows arms that generally move vertically or in lateral directions, radial arrangements, such as depicted in FIG. 11, may be employed in various embodiments. Returning to FIG. 10, additionally, each of the imaging detectors 1002 includes a detector unit 1014, at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general purpose imaging detector. A conventional imaging detector may be lame enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules. For example, each of the detector units 1014 may be 8×8 cm in size and be composed of a plurality of CZT pixelated modules (not shown). For example, each module may be 4×4 cm in size and have 16×16=256 pixels (pixelated anodes). In some embodiments, each detector unit 1014 includes a plurality of modules, such as an array of 1×7 modules. However, different configurations and array sizes are contemplated including, for example, detector units 1014 having multiple rows of modules.

It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) therethrough as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly.

Each of the imaging detectors 1002 has a radiation detection face, which is directed towards the subject 1010 or a region of interest within the subject.

The collimators 1022 (and detectors) in FIG. 10 are depicted for ease of illustration as single collimators in each detector head. Optionally, for embodiments employing one or more parallel-hole collimators, multi-bore collimators may be constructed to be registered with pixels of the detector units 1014, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in-between two adjacent pixels may have reduced sensitivity or decreased energy resolution or other performance degradation. Having collimator septa directly above the edges of pixels reduces the chance of a photon impinging at these degraded-performance locations, without decreasing the overall probability of a photon passing through the collimator.

A controller unit 1030 may control the movement and positioning of the patient table 1020, imaging detectors 1002 (which may be configured as one or more arms), gantry 1004 and/or the collimators 1022 (that move with the imaging detectors 1002 in various embodiments, being coupled thereto). A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially.

The controller unit 1030 may have a gantry motor controller 1032, table controller 1034, detector controller 1036, pivot controller 1038, and collimator controller 1040. The controllers 1030, 1032, 1034, 1036, 1038, 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually. The detector controller 1036 also may control movement of the imaging detectors 1002 in some embodiments to move closer to and farther from a surface of the subject 1010, such as, by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow (and shown as left and right as viewed in FIG. 10). In various embodiments, the detector controller 1036 may control the detector carriers 1016 or the support members 1012 to move in different lateral directions. Detector controller 1036 may control the swiveling motion of detectors 1002 together with their collimators 1022. In some embodiments, detectors 1002 and collimators 1022 may swivel or rotate around an axis.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may adjust a position of an adjustable collimator, such as a collimator with adjustable strips (or vanes) or adjustable pinhole(s).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, patient table 1020 and/or collimators 1022 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector arrays 1006 and 1008, which as illustrated in FIG. 10 are in a retracted position away from the subject 1010. Positioning may be accomplished manually by the operator and/or automatically, which may include using, for example, image information such as other images acquired before the current acquisition, such as by another imaging modality such as X-ray Computed Tomogaphy (CT), MRI, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as x-ray CT data. In some embodiments, a multi-modality imaging system may be provided, example, to allow performing NM or SPECT imaging, as well as x-ray CT imaging, which may include a dual-modality or gantry design as described in more detail herein.

After the imaging detectors 1002, gantry 1004, patient table 1020, and/or collimators 1022 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In one embodiment, at least one of detector arrays 1006 and/or 1008, gantry 1004, patient table 1020, and/or collimators 1022 are moved after being initially positioned, which includes individual movement of one or more of the detector units 1014 (e.g., combined lateral and pivoting movement) together with the swiveling motion of detectors 1002. For example, at least one of detector arrays 1006 and/or 1008 may be moved laterally while pivoted. Thus, in various embodiments, a plurality of small sized detectors, such as the detector units 1014 may be used for 3D imaging, such as when moving or sweeping the detector units 1014 in combination with other movements.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

FIG. 11 provides a schematic view of a nuclear medicine (NM) multi-head imaging system 1100 in accordance with various embodiments. Generally, the imaging system 1100 is configured to acquire imaging information (e.g., photon counts) from an object to be imaged (e.g., a human patient) that has been administered a radiopharmaceutical. The depicted imaging system 100 includes a gantry 1110 and a processing unit 1120.

The gantry 1100 defines a bore 1112. The bore 1112 is configured to accept an object to be imaged (e.g., a human patient or portion thereof). As seen in FIG. 11, plural detector units 1115 are mounted to the gantry 1110. In the illustrated embodiment, each detector unit 1115 includes an arm 1114 and a head 1116. The arm 1114 is configured to articulate the head 1116 radially toward and/or away from a center of the bore 1112 (and/or in other directions), and the head 1116 includes at least one detector, with the head 1116 disposed at a radially inward end of the arm 1114 and configured to pivot to provide a range of positions from which imaging information is acquired.

The detector of the head 1116, for example, may be a semiconductor detector. For example, a semiconductor detector various embodiments may be constructed using different materials, such as semiconductor materials, including Cadmium Zinc Telluride (CdZnTe), often referred to as CZT, Cadmium Telluride (CdTe), and Silicon (Si), among others. The detector may be configured for use with, for example, nuclear medicine (NM) imaging systems, positron emission tomography (PET) imaging systems, and/or single photon emission computed tomography (SPECT) imaging systems.

In various embodiments, the detector may include an array of pixelated anodes, and may generate different signals depending on the location of where a photon is absorbed in the volume of the detector under a surface if the detector. The volumes of the detector under the pixelated anodes are defined as voxels (not shown). For each pixelated anode, the detector has a corresponding voxel. The absorption of photons by certain voxels corresponding to particular pixelated anodes results in charges generated that may be counted. The counts may be correlated to particular locations and used to reconstruct an image.

In various embodiments, each detector unit 115 may define a corresponding view that is oriented toward the center of the bore 112. Each detector unit 115 in the illustrated embodiment is configured to acquire imaging information over a sweep range corresponding to the view of the given detector unit. Additional details regarding examples of systems with detector units disposed radially around a bore may be found in U.S. patent application Ser. No. 14/788,180, filed 30 Jun. 2015, entitled "Systems and Methods For Dynamic Scanning With Multi-Head Camera," the subject matter of which is incorporated by reference in its entirety.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

As used herein, the term "computer," "processor," or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer," "processor," or "module."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A radiation detector head assembly, the radiation detector head assembly comprising:
    a detector housing defining a cavity therein, the detector housing comprising a shell and a shielding body, the shell defining at least a portion of a perimeter surrounding the shielding body, the shell comprising an extrusion defining the at least a portion of a perimeter formed from a first material configured for rigidity, the shielding body comprising a second material configured to shield radiation; and
    a detector unit disposed within the cavity, the detector unit comprising an absorption member and associated processing circuitry, the processing circuitry configured to generate electronic signals responsive to radiation received by the absorption member.

2. The radiation detector head assembly of claim 1, wherein the first material is aluminum.

3. The radiation detector head assembly of claim 1, wherein the second material is lead.

4. The radiation detector head assembly of claim 1, further comprising:
- a collimator unit registered to the absorption member of the detector unit; and
- a compressible body interposed between the collimator unit and the absorption member.

5. The radiation detector head assembly of claim 1, further comprising a collimator unit, wherein the shielding body comprises an exposed surface, the exposed surface in direct contact with the collimator unit.

6. The radiation detector head assembly of claim 1, further comprising:
- a collimator unit registered to the absorption member of the detector unit; and
- end caps mounted to opposed ends of the detector housing, the collimator unit mounted to the end caps.

7. The radiation detector head assembly of claim 1, wherein the shell comprises location features machined into the opposed ends of the detector housing for mounting the end caps.

8. The radiation detector head assembly of claim 1, further comprising a heat transfer link operably coupled to the shell and the processing circuitry of the detector unit.

9. The radiation detector head assembly of claim 1, wherein the shell comprises heat transfer fins extending from an exterior edge of the shell.

10. A method of providing a radiation detector head assembly, the method comprising:
- extruding a first material to provide a shell defining a perimeter of a detector housing, the detector housing comprising a cavity;
- filling the perimeter of the shell with a second material to form a shielding body disposed within the shell, the second material configured to shield radiation; and
- disposing a detector unit within the cavity of the detector housing, the detector unit comprising an absorption member and associated processing circuitry, the processing circuitry configured to generate electronic signals responsive to radiation received by the absorption member.

11. The method of claim 10, wherein the first material is aluminum.

12. The method of claim 10, wherein the second material is lead.

13. The method of claim 12, wherein filling the perimeter of the shell comprises:
- orienting the shell to be aligned longitudinally with a gravitational field; and
- adding the second material to the shell to fill the shell in a direction opposed to the gravitational field.

14. The method of claim 10, further comprising removing a portion of the shell to provide an exposed surface of the shielding body.

15. The method of claim 10, further comprising mounting a collimator unit to the detector housing, wherein the collimator unit directly contacts the exposed surface.

16. The method of claim 10, further comprising
- mounting end caps to opposed ends of the detector housing; and
- mounting a collimator unit to the end caps.

17. The method of claim 16, further comprising positioning a compressible body between the collimator unit and the detector unit.

18. The method of claim 10, further comprising machining surfaces of the detector housing after the second material has been added to the shell to provide landmarks for mounting the detector unit.

19. The method of claim 10, further comprising operably coupling the processing circuitry of the detector unit to the shell with a heat transfer link.

20. The method of claim 19, wherein forming the shell includes forming heat transfer fins extending from an exterior edge of the shell.

\* \* \* \* \*